INVENTORS
GLEN F. NIELSEN
DONALD K. REX
ROBERT E. SCHOPP
LAWRENCE A. WILSON

By *Otto Schmid, Jr.*

ATTORNEY

United States Patent Office 3,519,801
Patented July 7, 1970

1

3,519,801
RECORD CARD PROCESSING MACHINE
Glen F. Nielsen and Donald K. Rex, San Jose, Robert E. Schopp, Campbell, and Lawrence A. Wilson, San Jose, Calif., assignors to International Business Machines Corporation, Armonk, N.Y., a corporation of New York
Filed Feb. 15, 1965, Ser. No. 432,599
Int. Cl. G06k 17/00
U.S. Cl. 235—61.6    10 Claims

ABSTRACT OF THE DISCLOSURE

A record card processing machine having a plurality of processing stations arranged so that two separate record card paths are provided through a part of the machine and common card paths are provided through other parts of the machine. An electromagnetic control means at each of the processing stations and a plurality of record card position sensing means spaced along the card paths are provided so that record cards can be selectively moved through the processing stations. The record cards are moved through the stations in accordance with signals generated by a programming means in combination with signals from the record card position sensing means to selectively actuate the electromagnetic control means to perform the programmed record card processing functions.

BACKGROUND OF THE INVENTION

This invention relates to a record card processing machine and, more particularly, to a single machine capable of performing all standard record card processing operations in one pass of the cards.

In the past, it has sometimes been necessary to use a plurality of record card processing machines to perform the requirements of a particular processing operation. Some of this equipment is operated on line and some equipment requires more than one pass of the record card through the machine to perform a particular function. This method of operation may require more personnel time and machine investment than is efficient for a particular operation. It is, therefore, the principal object of this invention to provide a record card processing machine capable of performing the functions, either singly or in combination, which formerly required a plurality of record card processing machines.

It is another object of the invention to provide a machine for use as an input-output component of a data processing system capable of performing the record card processing functions in a single pass through the machine under control of a stored program processor.

According to the invention, there is provided a machine having two card feeding means and a plurality of processing stations arranged so that two separate card paths are provided to a certain point and a common card path from that point; an electromagnetic control means at each of the stations and a plurality of card position sensing means spaced along the card paths; control means operative in conjunction with the sensing means at the plurality of stations; and, programmed instructions to selectively actuate the electromagnetic control means to perform the programmed record card processing functions.

2

The foregoing and other objects, features and advantages of the invention will be apparent from the following more particular description of preferred embodiments of the invention, as illustrated in the accompanying drawings.

The record card processing machine comprising the invention performs the functions of Reading, Punching, Sorting, Collating, Reproducing, Card Document Preparation (Printing) and Punched Card File Maintenance in a single pass of the cards through the machine whereas a plurality of single function machines some of which require multiple card passes have formerly been required to perform the same functions. Since the machine is capable of providing the standard record card functions in one pass of the cards, the machine is called the Multi-Function Card Machine (MFCM).

Figure 1:
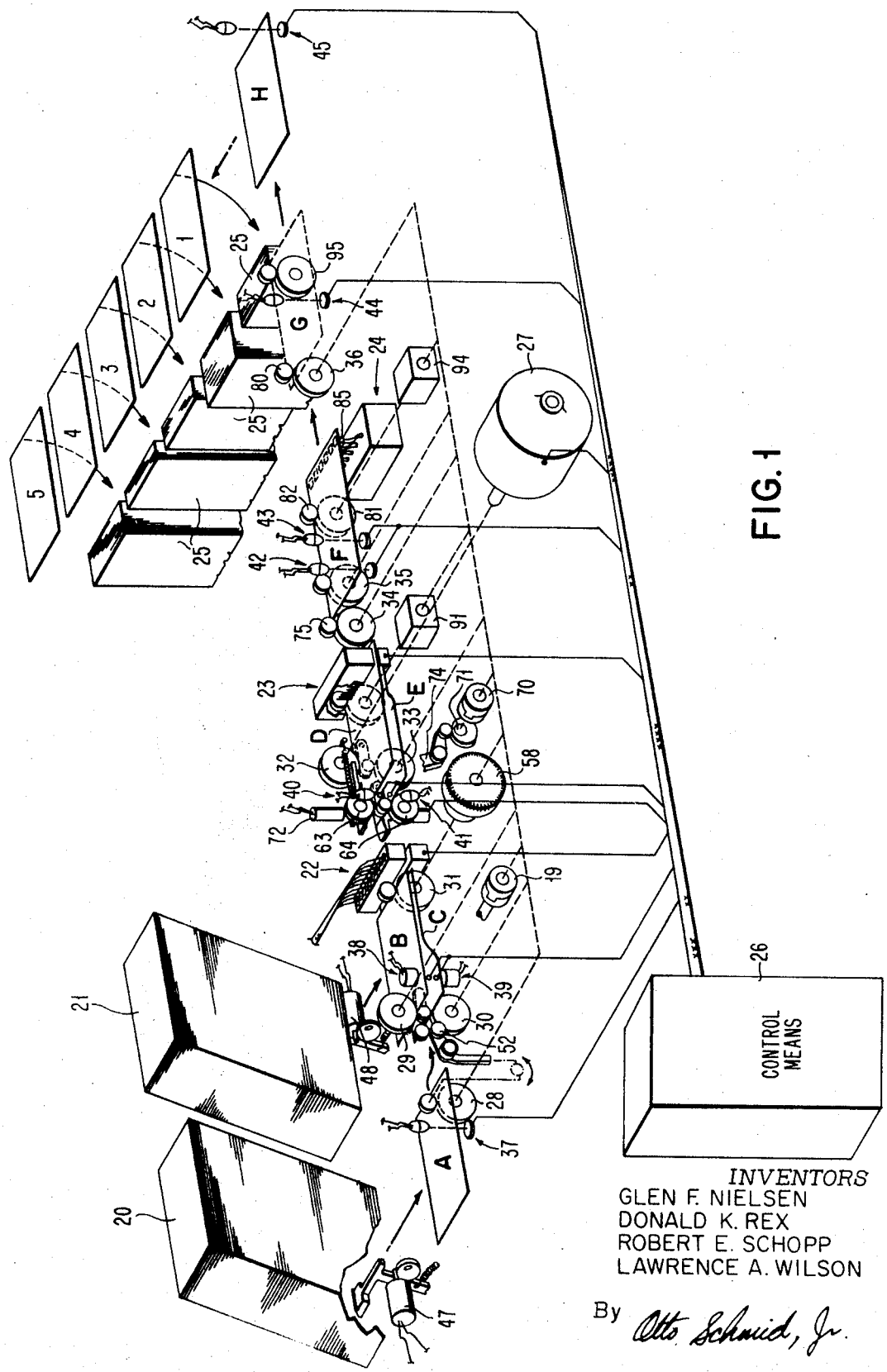
FIG. 1 is a diagrammatic perspective view of a record card processing machine embodying the invention.

Referring to FIG. 1 of the drawings, the MFCM comprises two card hoppers 20, 21, a card sensing station 22 that senses data in cards fed from either hopper, a card punching station 23, a print station 24, and five record card stackers 25, all mounted on suitable support means (not shown). The primary 20 and secondary 21 hoppers feed cards in parallel (row by row) to a waiting station. Once out of the hopper, the movement in both the primary and the secondary card paths becomes serial (column by column). The card from the primary hopper is moved into a primary input station A, whereas the card from the secondary hopper is moved into the secondary preread station B. A second card feed cycle is required to move the card from the primary input station to the primary preread station C, which directly underlies the secondary preread station. The primary and secondary card paths are separate through the preread B, C, read 22 and prepunched D, E stations, after which they converge into a single card path through the punch station 23, the print station 24 and on into the stacker corner station H. At the stacker corner station the cards are changed to feed parallel again until each reaches its selected radial stacker. At the stacker they rotate down and are joggled into the stacked position.

Card feeding through the machine is controlled by two electromagnetically energized clutched cam shafts, a plurality of interlock solenoids, a punch incremental drive mechanism, a plurality of magnetically selected pinch rolls and a plurality of stacker select magnets. A drive motor 27 is coupled by suitable belt means to drive a plurality of feeding means 28–36 when the motor is running and this drive connection is shown by dashed line in FIG. 1. An electromagnetically actuated feed clutch 19 is provided to selectively actuate the main cam shaft. A plurality of cams are mounted on the main cam shaft and these cams, through suitable followers and mechanical couplings, actuate various selected devices to control the movement of the record cards through the machine. Control means 26 is provided to develop electrical control signals to selectively actuate a plurality of electromagnetic control means which are operable to select the proper mechanical device to perform the programmed movement of record cards through the machine.

Figure 8:
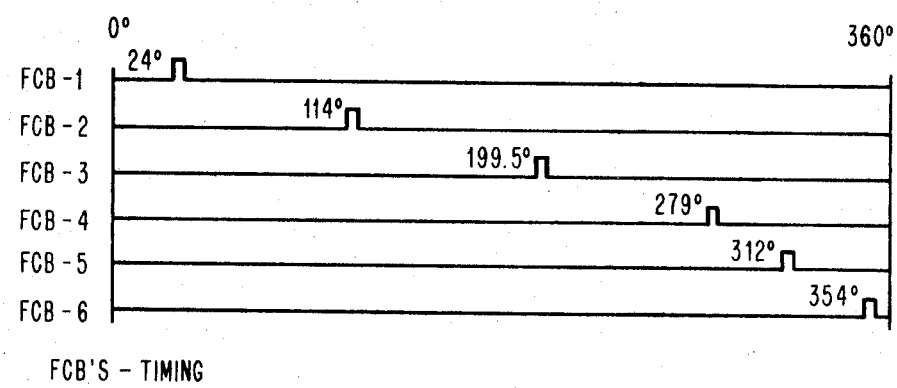
FIG. 8 is a plot of the voltage generated by the Feed CB's in one machine cycle.

A plurality of electrical signals are generated in the machine and sent to control means 26 to permit the electrical control signals to be synchronized with the mechanical movement of the cards through the machine. One set of electrical signals is generated by a timing device on the main cam shaft which generates a plurality of signals in synchronism with the rotation of the main shaft and these signals are designated the Feed CB signals as shown in FIG. 8. Punch CB and Print CB signals are also generated from timing devices mounted on the continuously running input shafts to the punch and print units respectively. Another set of electrical signals are generated by a plurality of card position sensing means 37–45 which are spaced throughout the card path to provide an electrical indication denoted CELL 1 through CELL 9, respectively, to sense the position of cards within the machine.

Control means 26 may comprise any suitable device for supplying control signals to perform the desired functions in accordance with the desired function and the output from the sensing means which shows the position of the record cards in the stations of the machine. Control means 26 may comprise the processor of an electronic data processing system, if desired. The machine may also be operated as a stand-alone unit in which case the machine would have its own control circuitry built in to cycle the machine through the desired steps to perform the processing function of the machine.

The control means for the machine comprises a storage means 90, a program decoder 87, a clock and cycle control means 88, and a control circuitry 89 to develop electrical signals to control the electromagnets of the machine to perform the desired function. In the case where the processor of an electronic data processing system is used to control the machine, the first three stated elements of the control means are normally present and the instructions are included as part of the stored program. In the case where the machine is operated as a stand-alone unit, the storage device may comprise any suitable device capable of exhibiting two stable states, such as a magnetic core storage system, an array of electronic bistable devices, or any other memory device having the operating speed and capacity necessary for the described operations. One type of control device suitable for use with the system is the type known as a read-only memory. This device is designed for programming in a predetermined manner, dependent upon the control manifestations entered into the memory at the start of operations. Cycling means are provided to read out sequential program steps to an external temporary storage device such as a register wherein a bit position of the register is coupled to control a particular electromagnet.

To make the MFCM ready to process cards, a manually actuated start key is depressed to energize the card run-in circuit. During card run-in, one card is moved into the secondary preread station to generate a signal signifying that the secondary card path is ready for processing. A card may be fed into the primary input station and then advanced to the primary preread station on the next feed cycle as a second card is fed into the primary input station to generate a signal denoting that the primary card path is ready for processing. Further operations of the MFCM are controlled by program instructions which specify the operations to be performed on the cards as they are moved through the stations of the machine. The basic instructions for controlling the machine are READ CARD, PUNCH CARD, PUNCH AND FEED CARD, PRINT CARD, and STACKER SELECT. Each of these instructions is specified for either a primary card or a secondary card. In a READ CARD operation the data is read from the card column by column and transferred to the storage device and stored in the designated area in storage. In a PUNCH CARD operation, the punch data is transferred from the storage device and punched in the card on a serial by character basis for the number of columns indicated in the instructions. Upon completion of the punch operation, the card remains in the punch station positioned at the column after the last column punched. The PUNCH AND FEED instruction is the same as the punch instruction, except that all cards in the designated feed advance one station after punching. The card that passes the read station, as a result of this command, is not read nor is the card that passes the print station printed. In the PRINT CARD instruction, the data to be printed is transferred from the designated place in the storage device and the specified number of characters are printed in a line on the card. A plurality of such heads are provided and a portion of the instruction determines which of the print heads are to be used. The STACKER SELECT instruction provides for selection of one of the five stackers. Stacker selection may be determined at any time after a card is read but before a card is ejected from the punch or print stations.

Figure 9:
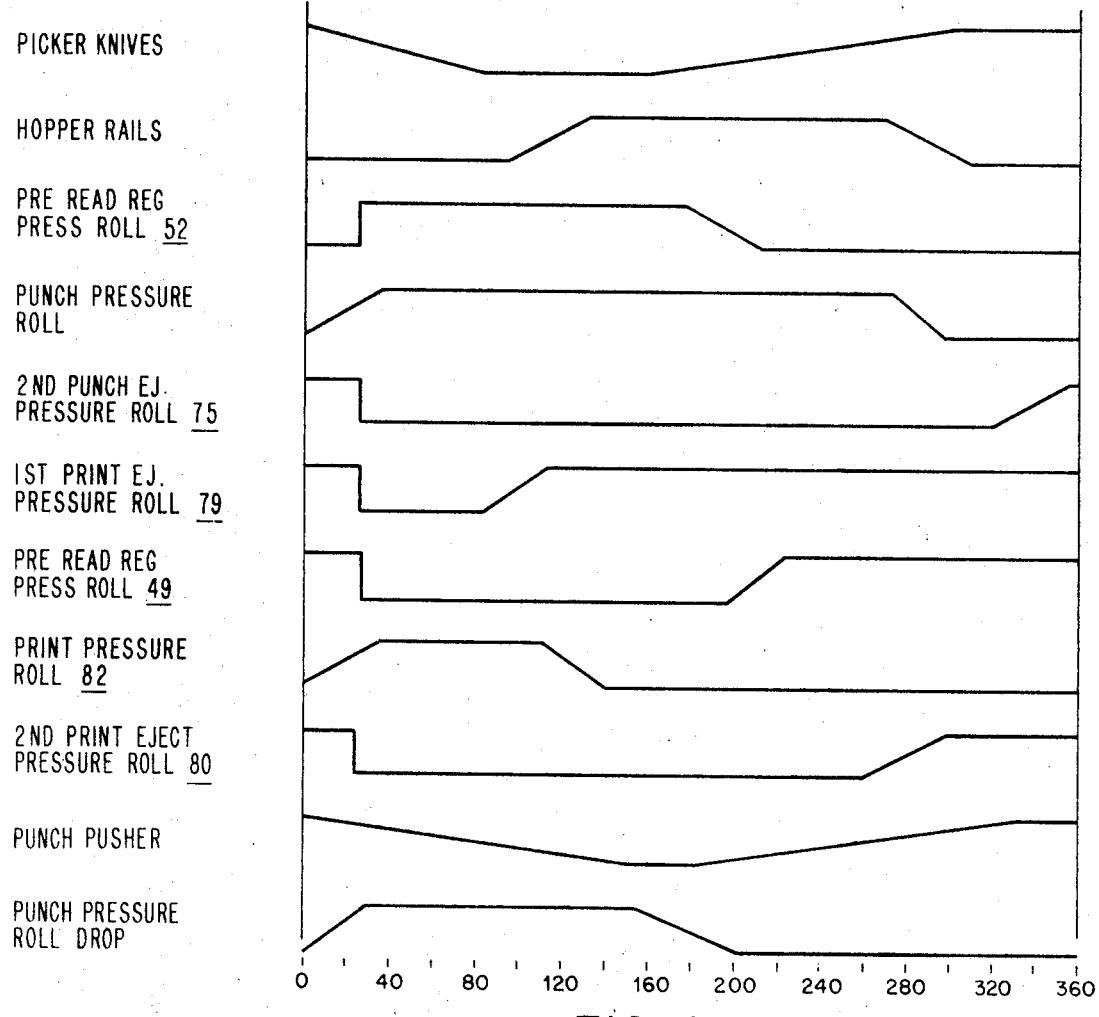
FIG. 9 is a cam timing diagram showing the relative time when the operations occur in one cycle of the machine of FIG. 1.

When the motor is running, a plurality of feedrolls are constantly running, and the start of card feeding through the machine is controlled by the feed clutch. Energization of the feed clutch causes a plurality of cams to take one revolution, as shown on the cam timing chart of FIG. 9. Primary and secondary hopper control magnets 47, 48 are provided and these magnets function to hold the hopper picker knives in an inoperative position except when energized.

Figure 2:
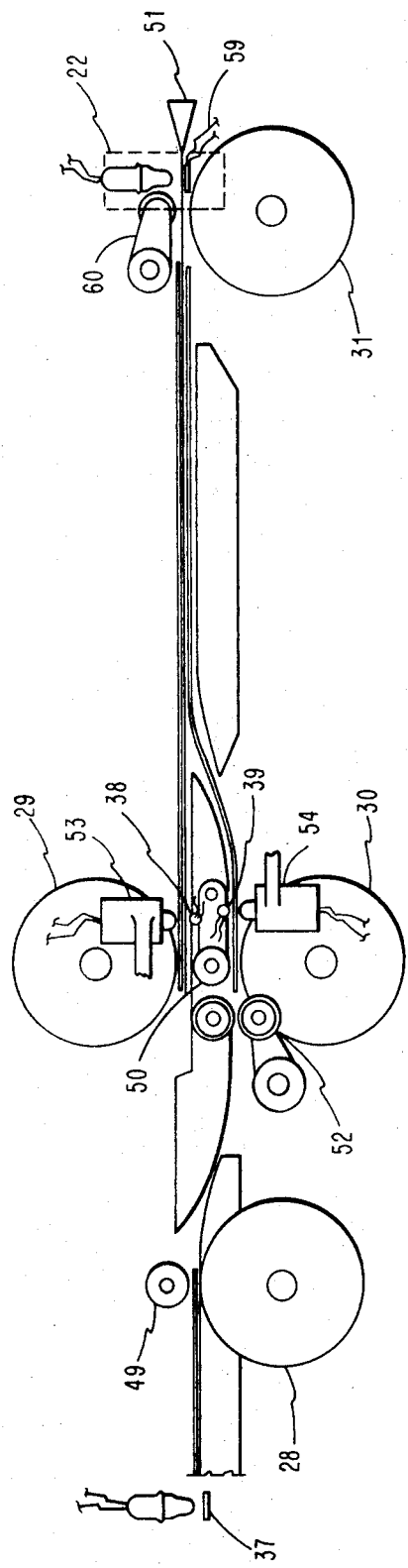
FIG. 2 is a side diagrammatic view of the card path of the Primary Hopper input, preread and read station areas of the machine.

When the main cam shaft takes one revolution, and primary hopper control magnet 47 is energized, a card will be fed out from that hopper to a position between feed roll 28 and pressure roll 49 as best seen in FIG. 2. If the secondary hopper control magnet 48 was energized, a card from that hopper would be fed out between feed roll 29 and pressure roll 50 on top of chute blade 51, which functions to separate the primary and secondary card paths. As another clutch cycle is taken with the primary hopper select solenoid 47 energized, pressure roll 49 closes on the card under action of a cam on the cam shaft, and feeds it until the trailing edge passes the pinch point, at which time roll 52 closes on the card (as roll 49 opens) to feed the card at low velocity until it leaves the pinch point. This card is thus fed under chute blade 51 with trailing edge between rolls 30 and 50. During this same cycle, a card is fed from the primary hopper into position between rolls 28 and 49. Pressure rolls 49 and 52 are mechanically linked so that as one opens the other closes and vice versa. With the machine loaded as shown in FIG. 2, additional clutch cycles can cause either the primary or secondary card to be read and a following card to be fed into the preread station. The reading is initiated by moving pressure roll 50 from its central or neutral position either up to pinch the card against constantly running roll 29 or down to pinch the card against constantly running roll 30.

Figure 4:
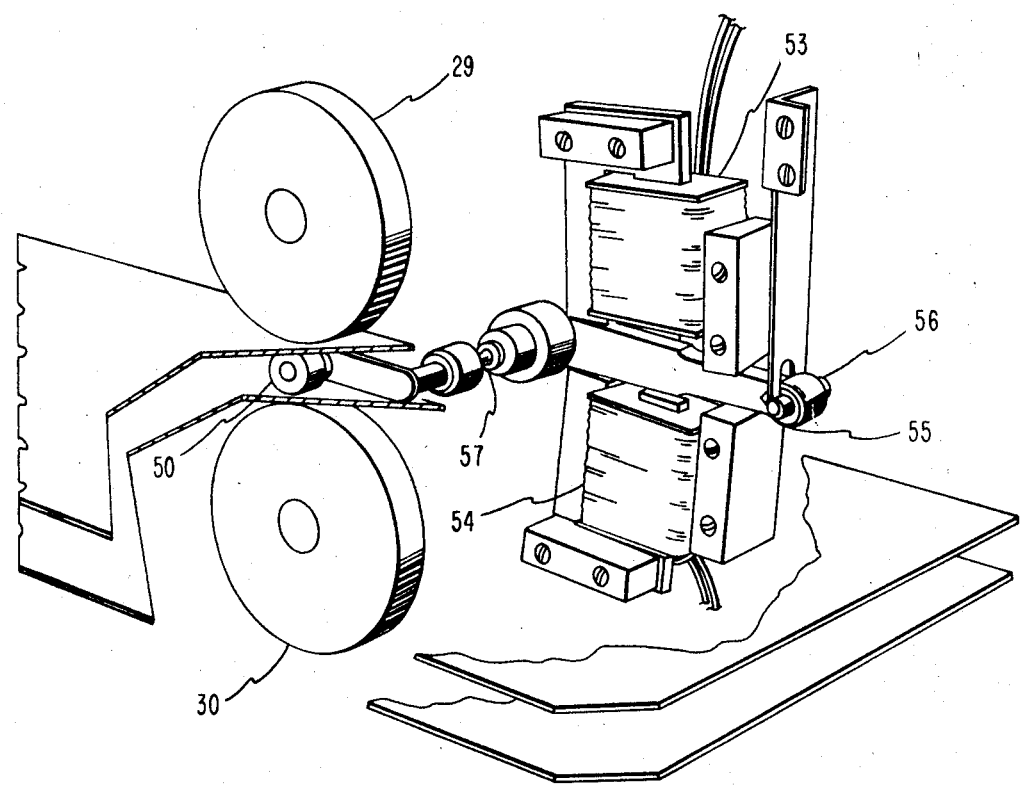
FIG. 4 is a perspective view of the magnetically selected pressure roll used in the part of the machine having separate card paths.
Figure 5:
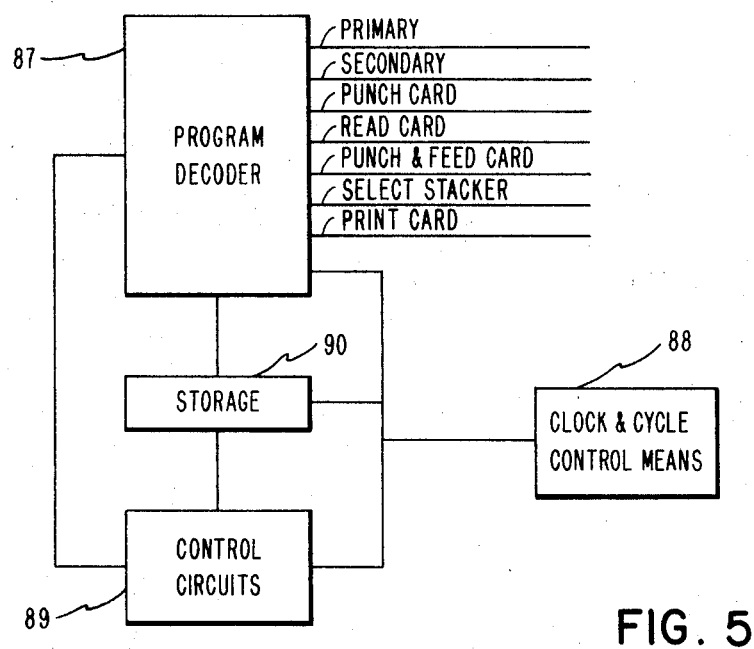
FIG. 5 is a schematic block diagram of control means 26 of the machine of FIG. 1.
Figure 6:
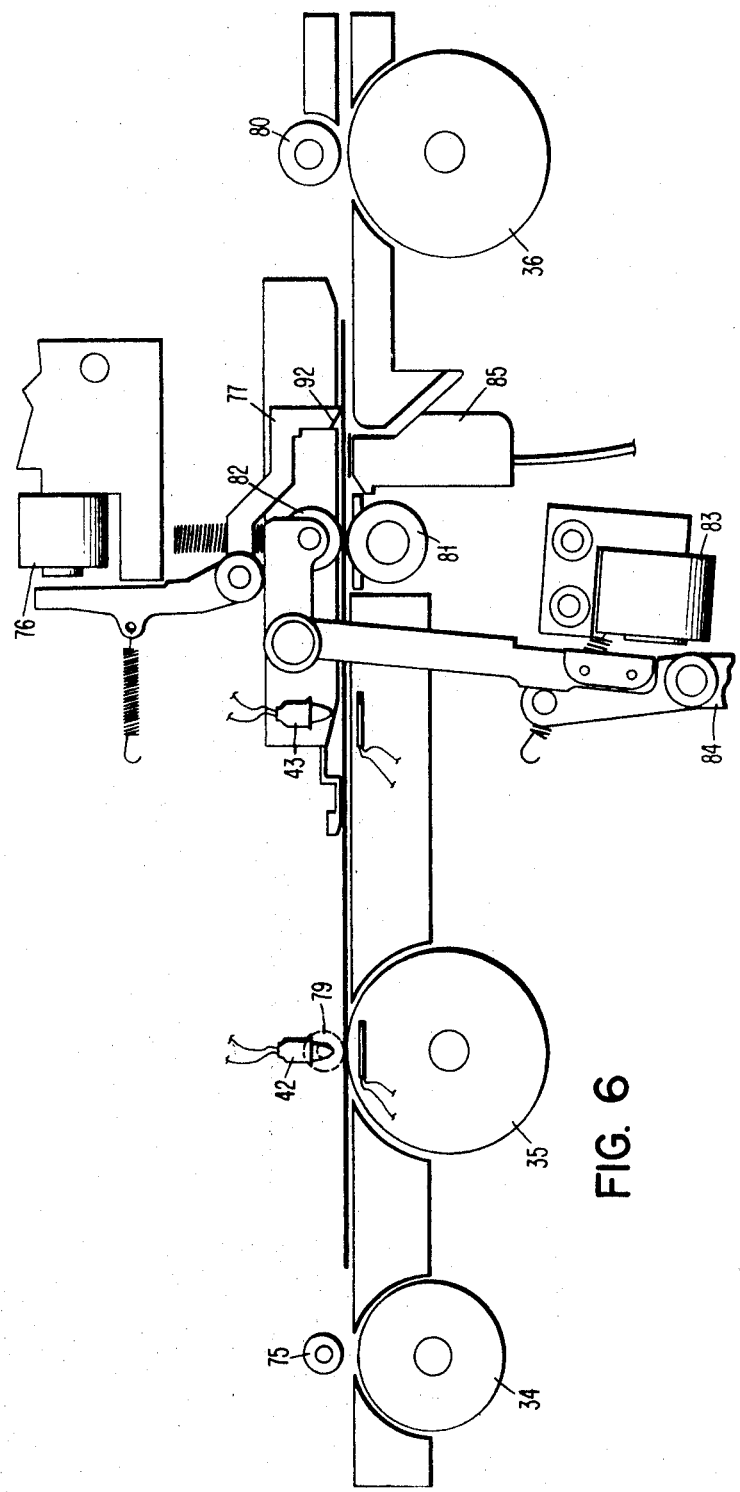
FIG. 6 is a side diagrammatic view of the card path from the punch station through the print station of the machine.
Figure 7:
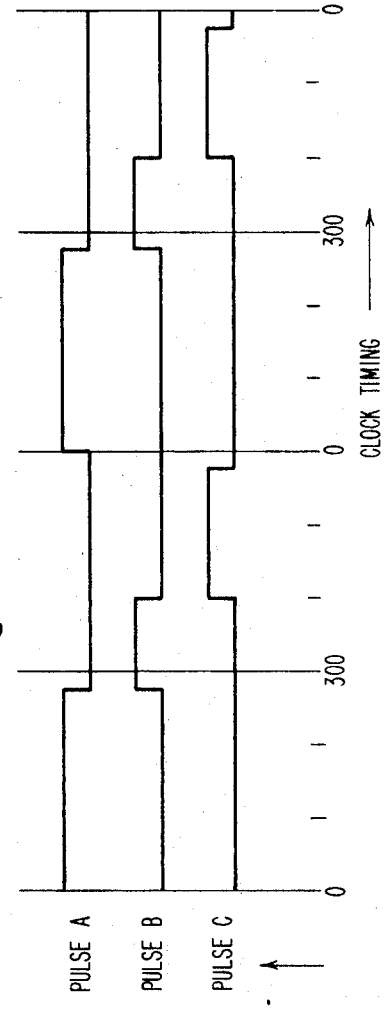
FIG. 7 is a plot of voltage on a time scale of the clock pulse output of the clock and cycle control means.

Referring to FIG. 4, as either magnet 53 or 54 is energized the armature 55 is attracted, against the detent force produced by the bearing 56 operating in the notched end of armature 55, to produce a torque transmitted through a torsion shaft 57 to provide a force at the pressure roll 50. This principle is used in the preread station as well as two places in the prepunch station, to be described later.

Upon receipt of a READ PRIMARY CARD or READ SECONDARY CARD instruction from the control means, the signal is coupled to energize either control magnet 53 or control magnet 54 to pivot the selective feeding means (pressure roll 50) to operate with feed roll 29 or feed roll 30 to drive the card through read station 22. The read station comprises a plurality of solar cells and a light source positioned so that when a data hole appears in a card the light shines through the hole to energize the associated solar cell and introduce an output signal. A timing device 58 is provided to produce a series of timing signals in synchronism with the movement of the data column of the card past the read station. The timing signals thus generated are sent along with data sensed by the solar cells to the control means, and the timing signals serve as gating means to gate the data into the storage area of the control means.

As column O of the card passes over the solar cells in the read station, the trailing edge of the card uncovers the solar cell 38 or 39 causing a write impulse to record a record track on the drum of the read emitter 58, which is attached to the same shaft as feed roll 31. The record track is sensed to produce the timing pulses. The record track is erased between cards.

Figure 3:
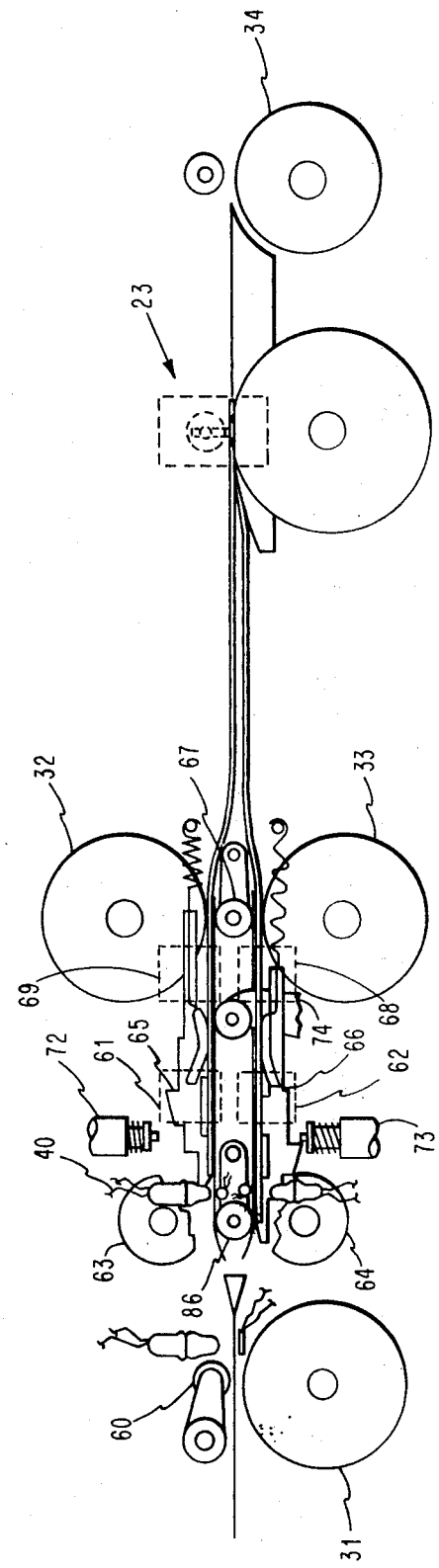
FIG. 3 is a side diagrammatic view of the card path from the read station through the punch station of the machine.

As the trailing edge of the card being read leaves the pinch point of feed roll 31 and pressure roll 60 (FIG. 3), pressure roll 86 is magnetically energized by magnets 61 or 62 to cooperate with either roll 63 or 64 to feed the card at a low velocity into a position where punch pusher means 65 or 66 can engage the trailing end of the card to push it into punch registration. If there is to be no punching in the card, it may be ejected through the punch station during the next feed clutch cycle, by magnetically engaging pressure roll 67 by magnets 68 or 69 with either constantly running roll 32 or 33. The pressure roll magnet is energized from CB one on the main cam shaft. If punching is to occur, the magnetically controlled punch pusher spring clutch 70 is energized to drive cam shaft 71 for one revolution. The punch signal from the program decoder is coupled to energize electro-magnet 72 for a PCH CD SEC instruction or electro-magnet 73 for a PCH CD PRI instruction. This action allows either secondary punch pusher 65 or primary punch pusher 66 to follow the cam follower arm 74 which in turn follows the punch pusher cam on shaft 71 pushing the selected card into proper registration to be punched. In FIG. 3 the secondary card is shown registered for punching.

Punching is accomplished in a serial by character manner and any suitable punch mechanism having sufficient speed and small size capable of being controlled by electrical signals may be used. Since motion of the card must be stopped for at least the time the punch member is in the card, the punch drive mechanism 91 must move the record card through the punching station incrementally. Any suitable incremental drive capable of being controlled by electrical signals may be used. One suitable punch mechanism is that described in copending application S.N. 269,040 filed Mar. 29, 1963, entitled "Punch Mechanism" by Daniel P. Darwin, now U.S. Pat. No. 3,194,494. As soon as the last column is punched, a card feed cycle may be initiated to eject the punched card and read and register another card.

The punch unit eject rolls 34, 75 feed the card at high velocity into the print station. As the card passes solar cell 43 a signal is generated to energize magnet 76, causing gate 77 to close in time to stop the card for printing. An inclined surface 92 is provided on gate member 77 which forms a wedge when card gate 77 abuts the card bed surface to stop the card in proper print registration. The lateral alignment at the print station is provided by a print patter which is energized to move the card against a side guide when the leading edge of the card covers cell 42 and remains energized until the trailing edge of the card uncovers cell 42. After the card has come to rest, gate 77 is opened so that card may be fed either by eject rolls 79, 35 and 80, 36, if no printing is to be done, or by incremental rolls 81, 82 if printing is required. Pressure rolls 79 and 80 are operated from the card feed clutch cam shaft. Pressure roll 82 is dropped during a dwell of the incremental drive of feed roll 81 by releasing no work magnet 83.

Printing may be conducted by any printing device having sufficient speed and small enough in size to fit along the card path. In the embodiment shown, printing is accomplished by a plurality of wire matrix print heads 85. Each wire is attached to a bell crank which is urged by a spring to follow a cam and is restrained by a magnet. The magnets are continuously energized by common hold coil and selectively de-energized by electrical signals coupled to individual buck coils. The operation of such a printer is described in co-pending application Ser. No. 378,616 filed June 29, 1964, entitled "Wire Printer" by Roland D. Nelson, now U.S. Pat. No. 3,302,562.

To accomplish the many functions of which the MFCM is capable, various machine cycles are used. Each cycle results in a specific series of card movements. Each instruction comprises one or more specific cycles, depending upon the position of the cards in the feed paths when the particular instruction is given. The position of the cards in the feed paths is sensed by card position sensing means 37–45 and an output cell 1-cell 9 of the sensing means is coupled to the electronic control circuitry so that the movement of the cards can be controlled in the desired manner. The sensing means comprise a suitable light source and a light sensitive device such as a solar cell, for example. The light and cell are mounted on opposite sides of the card path so that a card interrupts the light and causes the output voltage to go down. The output of the cells is coupled to a latch which is set when the cell is dark to produce the control signal CLL DK LT.

The first of the three types of card feed cycles is the run-in cycle. In the primary run-in cycle, the card from the primary input station is advanced to the primary preread station and a new card is fed from the primary hopper into the primary input station. In the secondary run-in cycle, a card is fed from the secondary hopper into the secondary preread station.

In a feed cycle the cards in all stations which belong to the elected feed are advanced to the next station. Assuming that a card is at each station, the movement of all cards is simultaneous. The cards from the preprint station move to the stacker and if no stacker has been specified the primary cards are stacked into stacker 1 and the secondary cards are stacked into stacker 5. The card moves from the primary prepunch station through the punch unit to the preprint station. The card from the primary preread station moves through the read station to the primary prepunch station. This card is read as it passes the read unit and the data is transferred to the storage device. The card from the primary input station moves to the primary preread station and a card is fed from the primary hopper to the primary input station.

The cards in the other card path are not affected by the instruction and these cards do not move. A feed cycle always results from a READ CARD instruction or a PUNCH AND FEED instruction.

Another type of card feed cycle is an eject cycle. The eject cycle causes a card in the punch station to be advanced to the preprint station and the cards, if any, in the print station to be moved into the selected stacker. This type of card feed cycle may occur only if there is a card already in the punch station, and the cards in all the other stations may or may not remain in place.

A wide variety of card movements is possible because of the degree of selective control over cards in the various stations throughout the machine. The charts below depict some operations that can occur in the machine on the next cycle starting from the stated initial card positions when the machine is latched ready for processing. There are many variations that have not been shown, but those listed clearly depict the machine functions and lead logically to others. The charts are arranged with the possible operations listed on the left and each vertical column designates a possible combination of card operations during the next feed cycle. For example, the first vertical column in chart depicts operation wherein a card is fed from the primary hopper to the primary input station, the card in the primary input station is fed to the primary preread station, the primary card is read and the cards are ejected from both the punch and the print stations.

CHART A.—CARDS IN ALL STATIONS

|  | A | B | C | D | E | F | G | H | I | J |
|---|---|---|---|---|---|---|---|---|---|---|
| Primary Hopper Feed | X | | | | | | | | | |
| Primary Corner Feed | X | | | | | | | | | |
| Secondary Hopper Feed | | X | | | | | | | | |
| Primary Read | X | | X | | | | | | | |
| Secondary Read | X | | X | | | | | | | |
| Primary Punch Push | | | | X | | | | | | |
| Secondary Punch Push | | | | | X | | | | | |
| Primary Punch | | | | | | | | | | |
| Secondary Punch | | | | | | | | | | |
| Primary Punch Eject | X | | X | | | X | | | | |
| Secondary Punch Eject | X | | X | | | | X | | | |
| Print Feed | | | | X | X | | | | | |
| Print Eject Corner and Stack | X | X | X | X | | X | X | X | | |

CHART B.—NO CARD IN PRIMARY READ STATION

|  | A | B | C | D | E | F | G | H | I | J |
|---|---|---|---|---|---|---|---|---|---|---|
| Primary Hopper Feed | X | X | | | | | | | | X |
| Primary Corner Feed | X | X | | | | | | | | X |
| Secondary Hopper Feed | | | X | | | | | | | |
| Primary Read | | | | | | | | | | |
| Secondary Read | | | X | X | | | | | | |
| Primary Punch Push | | | | X | | | | | | |
| Secondary Punch Push | | | | | X | | | | | |
| Primary Punch | | | | | | | | | | |
| Secondary Punch | | | | | | | | | | |
| Primary Punch Eject | X | | | | X | | | | | |
| Secondary Punch Eject | X | X | | | | X | | | | |
| Print Feed | | | | | X | X | | | X | |
| Print Eject Corner and Stack | X | X | X | | X | X | X | | X | |

CHART C.—NO CARD IN SECONDARY PREREAD STATION

|  | A | B | C | D | E | F | G | H | I | J |
|---|---|---|---|---|---|---|---|---|---|---|
| Primary Hopper Feed | X | | | | | | | | | |
| Primary Corner Feed | X | | | | | | | | | |
| Secondary Hopper Feed | | | X | X | X | | | | | |
| Primary Read | X | X | | | | | | | | |
| Secondary Read | | | | | | | | | | |
| Primary Punch Push | | | | | | X | | | | |
| Secondary Punch Push | | | | | | | X | | | |
| Primary Punch | | | | | | | | | | |
| Secondary Punch | | | | | | | | | | |
| Primary Punch Eject | X | X | X | | | | | | | |
| Secondary Punch Eject | | | | X | | | | | | |
| Print Feed | | | | | X | X | X | | | |
| Print Eject Corner and Stack | X | X | X | X | | X | X | | | |

CHART D.—PRIMARY PUNCH CARD HAS BEEN PUNCHED

|  | A | B | C | D | E | F | G | H | I | J |
|---|---|---|---|---|---|---|---|---|---|---|
| Primary Hopper Feed | X | | | | | | | | | |
| Primary Corner Feed | X | | | | | | | | | |
| Secondary Hopper Feed | | | | | | | | | | |
| Primary Read | X | X | | | | | | | | |
| Secondary Read | | | | | | | | | | |
| Primary Punch Push | | | | | | | | | | |
| Secondary Punch Push | | | | | | | | | | |
| Primary Punch | | | | | | | | | | |
| Secondary Punch | | | | | | | | | | |
| Primary Punch Eject | X | X | X | | | | | | | |
| Secondary Punch Eject | | | | | | | | | | |
| Print Feed | | | | | | | | | | |
| Print Eject Corner and Stack | X | X | X | | | | | | | |

CHART E.—SECONDARY PUNCH CARD HAS BEEN PUNCHED

|  | A | B | C | D | E | F | G | H | I | J |
|---|---|---|---|---|---|---|---|---|---|---|
| Primary Hopper Feed | | | | | | | | | | |
| Primary Corner Feed | | | | | | | | | | |
| Secondary Hopper Feed | X | | | | | | | | | |
| Primary Read | | | | | | | | | | |
| Secondary Read | X | X | | | | | | | | |
| Primary Punch Push | | | | | | | | | | |
| Secondary Punch Push | | | | | | | | | | |
| Primary Punch | | | | | | | | | | |
| Secondary Punch | | | | | | | | | | |
| Primary Punch Eject | | | | | | | | | | |
| Secondary Punch Eject | X | X | X | | | | | | | |
| Print Feed | | | | | | | | | | |
| Print Eject Corner and Stack | X | X | X | | | | | | | |

CHART F.—PRIMARY PUNCH CARD HAS BEEN EJECTED AND REGISTERED IN THE PRINT STATION

|  | A | B | C | D | E | F | G | H | I | J |
|---|---|---|---|---|---|---|---|---|---|---|
| Primary Hopper Feed | X | | | | | | | | | |
| Primary Corner Feed | X | | | | | | | | | |
| Secondary Hopper Feed | | | | | X | | | | | |
| Primary Read | X | X | X | | | X | | | | |
| Secondary Read | | | | | X | X | | | | |
| Primary Punch Push | | | | | | | | | | |
| Secondary Punch Push | | | | | | X | | | | |
| Primary Punch | | | | | | | | | | |
| Secondary Punch | | | | | | | | | | |
| Primary Punch Eject | | | | | | | | | | |
| Secondary Punch Eject | | | | | | X | X | X | | |
| Print Feed | | | | X | | | X | | | |
| Print Eject Corner and Stack | X | X | | X | | X | X | X | | |

CHART G.—SECONDARY PUNCH CARD HAS BEEN EJECTED AND REGISTERED IN THE PRINT STATION

|  | A | B | C | D | E | F | G | H | I | J |
|---|---|---|---|---|---|---|---|---|---|---|
| Primary Hopper Feed | | | | | X | | | | | |
| Primary Corner Feed | | | | | X | | | | | |
| Secondary Hopper Feed | X | | | | | | | | | |
| Primary Read | | | | | X | X | | | | |
| Secondary Read | X | X | X | | | | | | | |
| Primary Punch Push | | | | | | X | | | | |
| Secondary Punch Push | | | | | | | | | | |
| Primary Punch | | | | | | | | | | |
| Secondary Punch | | | | | | | | | | |
| Primary Punch Eject | | | | | | X | X | X | | |
| Secondary Punch Eject | | | | | | | | | | |
| Print Feed | | | | X | | | X | | | |
| Print Eject Corner and Stack | X | X | | X | | X | X | X | | |

CHART H.—CARD EJECTED FROM PRINT STATION

|  | A | B | C | D | E | F | G | H | I | J |
|---|---|---|---|---|---|---|---|---|---|---|
| Primary Hopper Feed | X | | | | | | | | | |
| Primary Corner Feed | X | | | | | | | | | |
| Secondary Hopper Feed | | | X | | | | | | | |
| Primary Read | X | X | | | | | | | | |
| Secondary Read | | | X | X | | | | | | |
| Primary Punch Push | | | | | X | | | | | |
| Secondary Punch Push | | | | | | X | | | | |
| Primary Punch | | | | | | | | | | |
| Secondary Punch | | | | | | | | | | |
| Primary Punch Eject | X | X | X | | | | | | | |
| Secondary Punch Eject | | | | X | X | X | | | | |
| Print Feed | | | | | | | | | | |
| Print Eject Corner and Stack | | | | | | | | | | |

CHART I.—PRINTING COMPLETED, CARD IS READY FOR PRINT EJECT

|  | A | B | C | D | E | F | G | H | I | J |
|---|---|---|---|---|---|---|---|---|---|---|
| Primary Hopper Feed | X | | | | | | | | | |
| Primary Corner Feed | X | | | | | | | | | |
| Secondary Hopper Feed | | X | | | | | | | | |
| Primary Read | | X | | X | | | | | | |
| Secondary Read | | | X | | X | | | | | |
| Primary Punch Push | | | | | | X | | | | |
| Secondary Punch Push | | | | | | | | | | |
| Primary Punch | | | | | | | | | | |
| Secondary Punch | | | | | | | | | | |
| Primary Punch Eject | X | | X | | | | X | | | |
| Secondary Punch Eject | | X | | X | | | | X | | |
| Print Feed | | | | | | X | X | | | |
| Print Eject Corner and Stack | X | X | X | X | | | X | X | X | |

The control circuitry comprises electronic circuitry for combining electrical signals from the storage unit, the instruction decoder, the card position sensing means, and the machine control signals to perform the desired function in the machine. To make the MFCM ready to process cards, two cards must be in the primary card path, or one card in the secondary card feed, or both. Cards are entered into these stations in the run-in cycles of the machine. The function of the card run-in cycle is to set the Start Latch and the Motor Latch. The feed clutch can then be energized to start the mechanical cycle of the machine. The hopper magnets are then energized to feed the cards to the appropriate places and when the card run-in cycles are complete, the Primary Ready Latch and/or the Secondary Ready Latch is set so that the machine is then available for operation under control of the control means.

Figure 10:
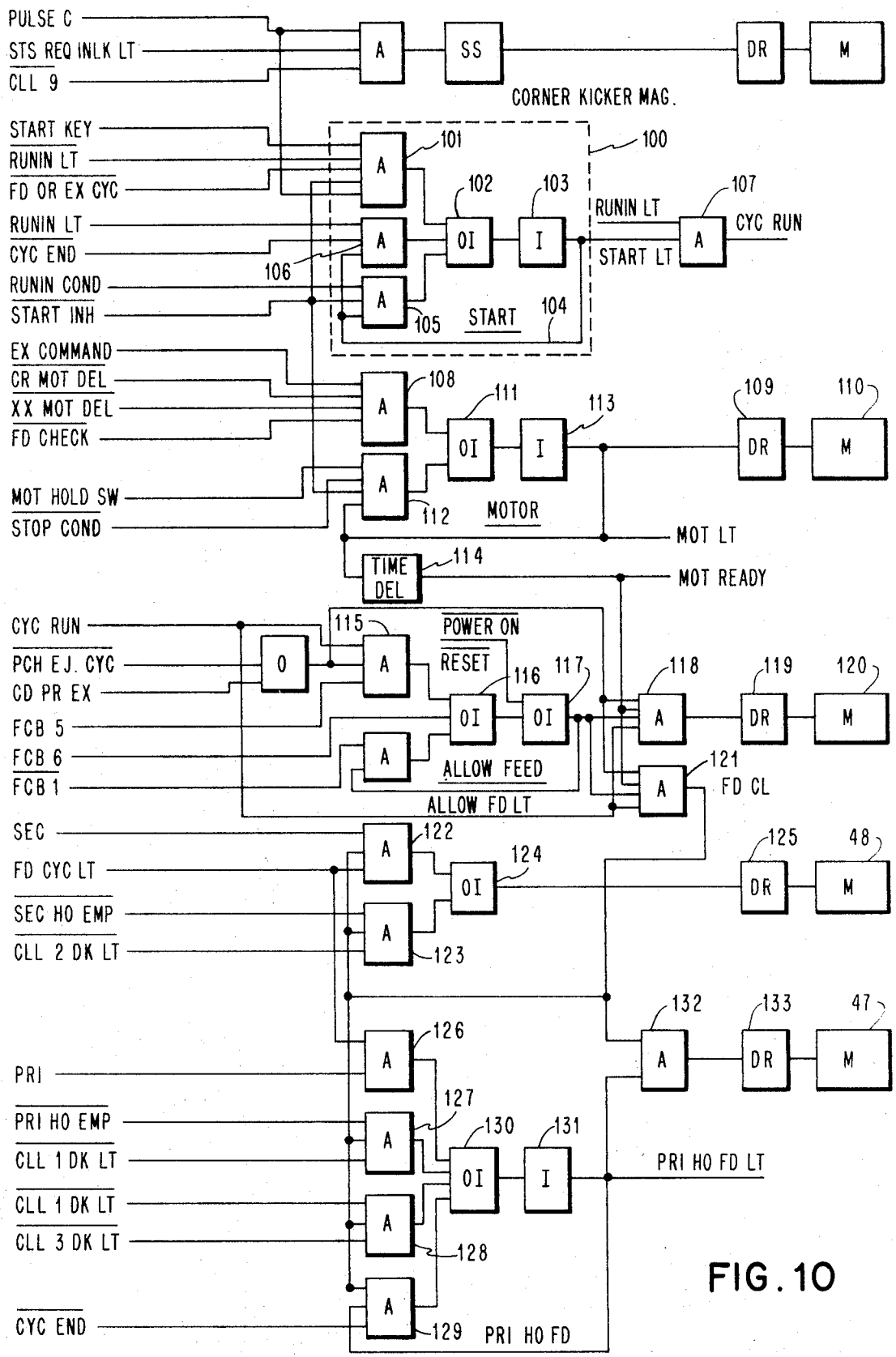
FIG. 10 is a schematic block diagram of the control circuits for hopper and motor control of the machine.

The circuit (FIG. 10) for controlling the run-in cycle of the machine comprises a Start Key which is a manually operated switch on the control panel of the machine. This switch closes a circuit which in conjunction with the PULSE C, NOT FD OR EXEC CYC and NOT RUNIN LT signals conditions AND circuit 101, and the output is coupled to energize OR INVERT circuit 102. The OR INVERT circuit is an OR circuit with an inverted output. The output of OI 102 is coupled through inverter 103 to set the start latch 100. The Start Latch comprises the circuit components within the dotted lines in FIG. 10. The latching connection is over lead 104 to one input of AND circuits 105 and 106. So long as one of the AND circuits 105, 106 remains conditioned, the latch output remain up even though AND circuit 101 may be deconditioned. Deconditioning AND circuits 105 and 106 resets the latch and the output then goes down. Other types of latches may be used, but this latch configuration is used since it is easier to achieve with circuit techniques currently being used.

The output of the Start Latch is coupled to one input of an AND circuit 107 and the other input is the signal RUNIN LT. When the signals NOT CLL 1DK LT and NOT CLL 2 DK LT are present with the START 1 signal, the RUNIN LT is set. When AND circuit 107 is conditioned the signal CYCLE RUN is produced. The signals EXE COMMAND, NOT CR MOT DEL, NOT XX MOT DEL, and NOT FD CHECK are combined in AND circuit 108 to set the Motor Latch through OI 111, I 113 and AND 112. The output of the Motor Latch is coupled through driver 109 to actuate the motor relay 110. The output of the Motor Latch is also coupled through a time delay circuit 114 to produce the signal MOT READY. The time delay is provided to permit the motor to reach operating speed before any processing takes place. A typical value for this delay is one-half second.

The Allow Feed Latch is set through OI 116 and OI 117 when feed CB 5 signal is generated, since AND circuit 115 is then conditioned by the coincident presence of the CYC RUN, the FCB 5 and a NOT PCH EJ CYC signal. The output of the ALLOW FEED latch is coupled to one output of AND circuit 118. The simultaneous presence of the MOT READY, the CYC RUN, and the NOT PCH EJ CYC signals condition AND circuit 118 to produce an output which is coupled through driver 119 to energize the Feed Clutch Magnet 120. The same four signals are also coupled to AND circuit 121 and the output of this circuit produces the signal FD CL.

The feeding of cards from the hoppers is controlled by electromagnets 47, 48 which are selectively energized to permit the picker knife to pick a card during a feed cycle. The secondary hopper magnet 48 is controlled by AND circuit 122 which is conditioned by the signals FD CL, SEC and FD CYC LT. The output of AND circuit 122 is coupled through OI circuit 124 and driver 125 to energize the Secondary Hopper Magnet 48. Magnet 48 may also be energized through AND circuit 123 which is conditioned by the signals FD CL, NOT SEC HO EMP, and NOT CLL 2 DK LT. The Primary Hopper Feed Latch comprises AND circuits 126–129, OI 130 and inverter 131. The Primary Hopper Feed Latch may be set by the presence of the PR 1, FD CYC LT, AND circuit 122 and reset by the signals NOT CYC END or FD CL. The output of the latch is coupled to AND circuit 132 and the presence of the FD CL signal causes the magnet 47 to be energized through driver 133. The signals from the instruction decoder are coupled to latches to set the proper condition in the control circuitry.

Figure 11:
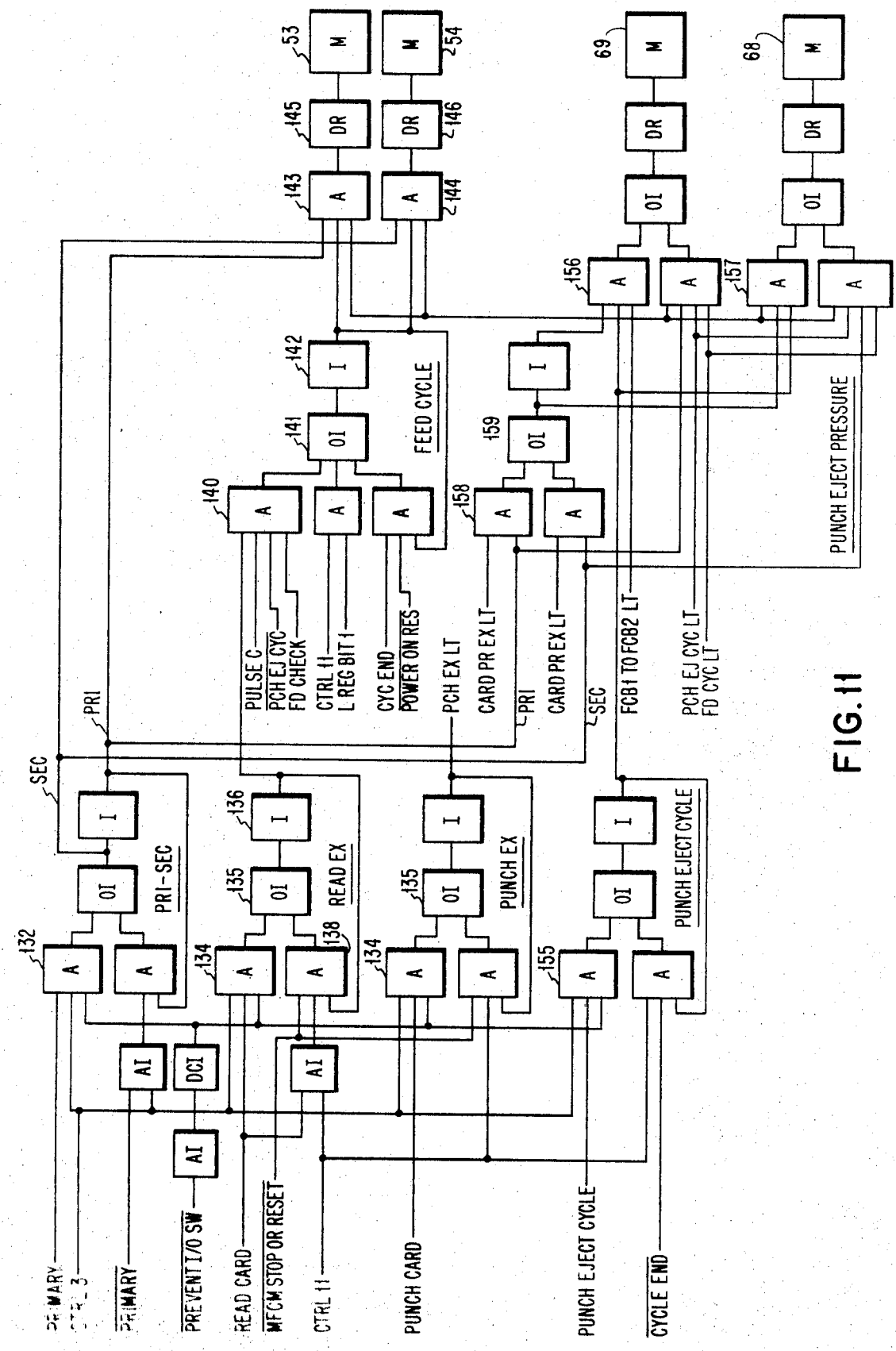
FIG. 11 is a schematic block diagram of the control circuits for feed and execute controls of the machine.
Figure 12:
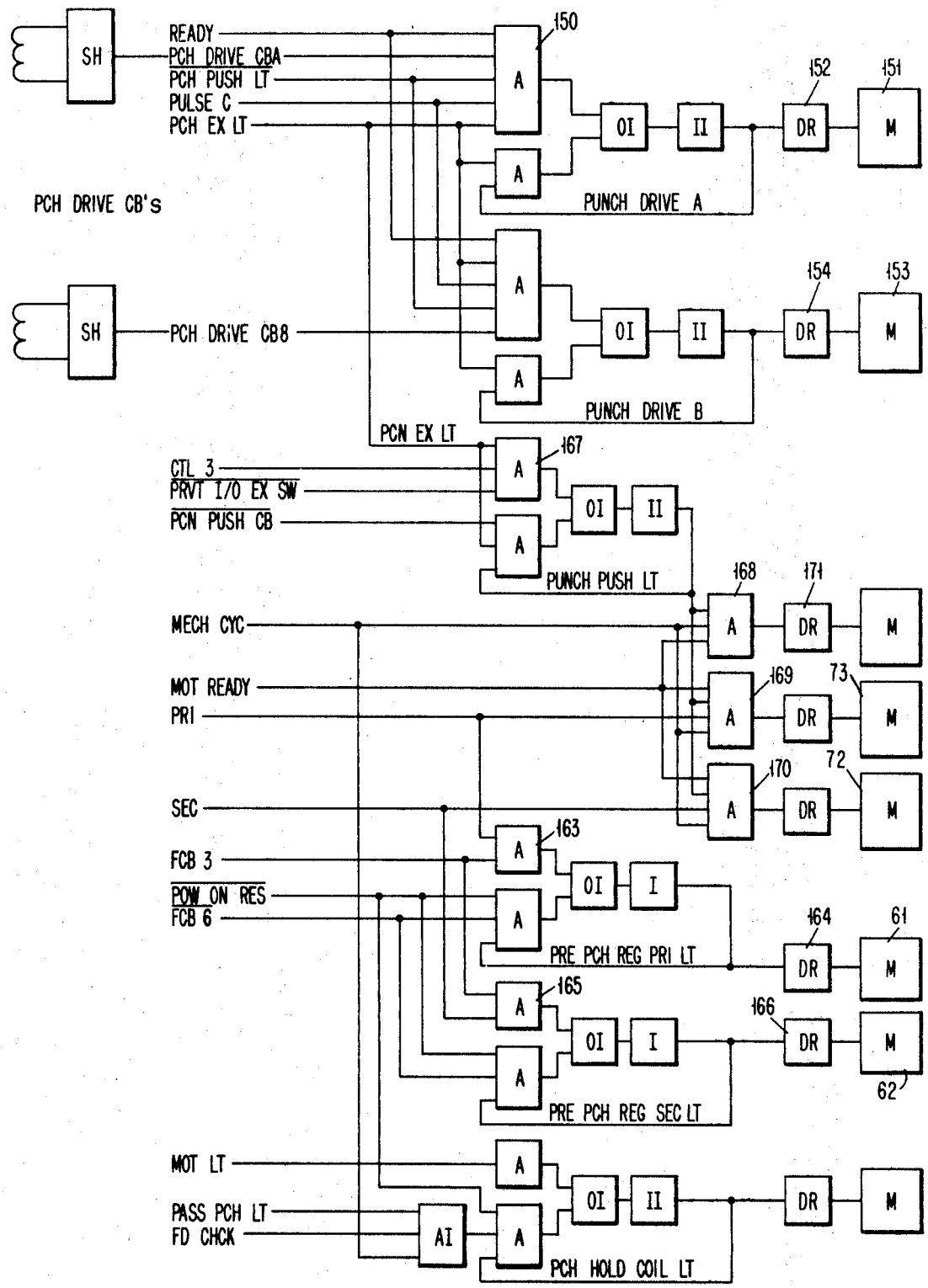
FIG. 12 is a schematic block diagram of the circuits for control of the punching operation of the machine.
Figure 13:
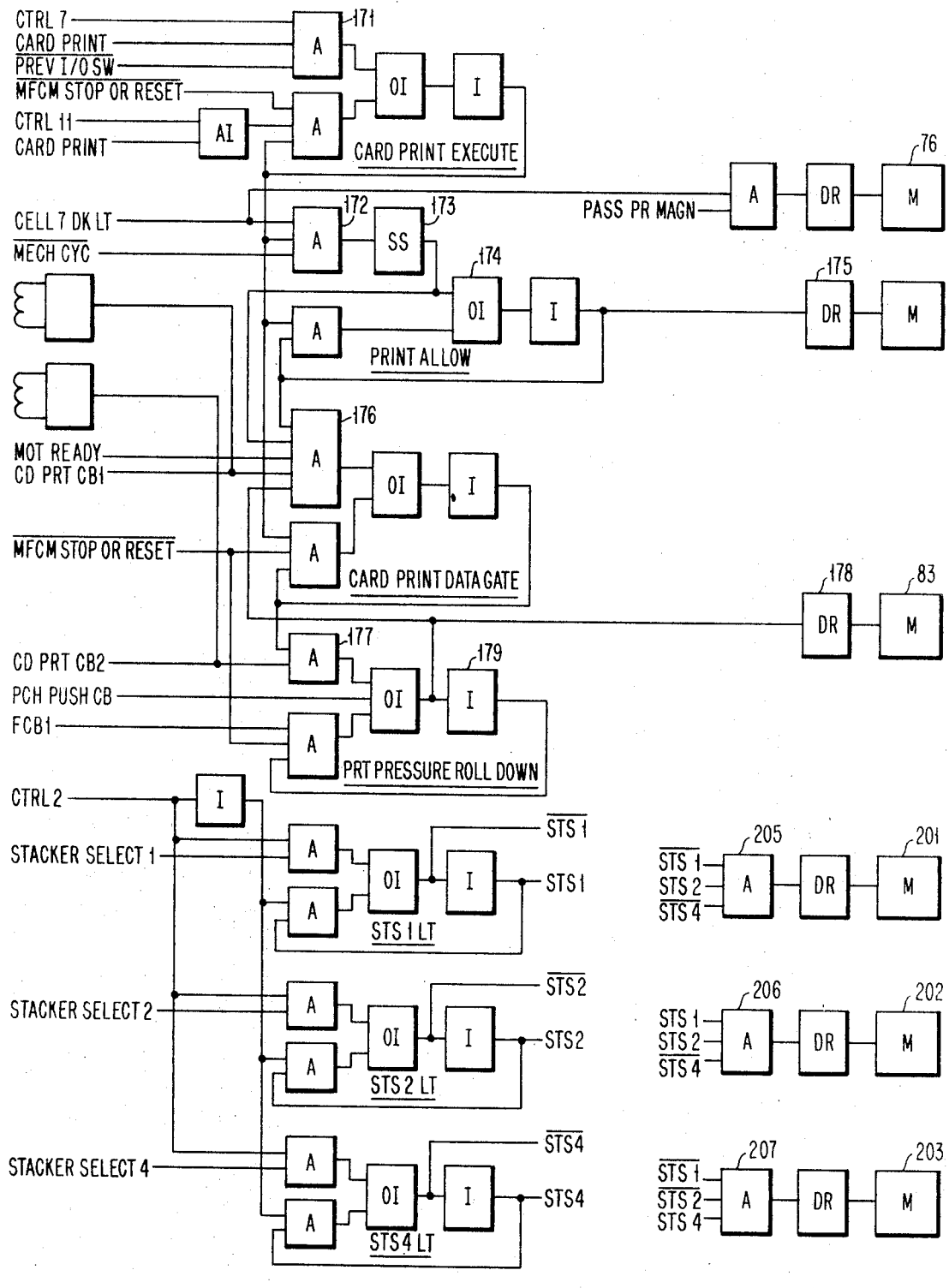
FIG. 13 is a schematic block diagram of the control circuits for print and stacker select operations of the machine.

The signal from the instruction decoder which denotes whether the PRIMARY or SECONDARY feed is to be used is coupled through AND circuit 184 (FIG. 11) where the signal is combined with a CTRL 3 signal and a NOT PREV I/O SW signal. The previous two signals are control signals within the processing system. The output of the primary and secondary latch is the PRI signal. The signal SEC is taken before inverter 183 to generate a primary signal. In the same manner, the signals for FEED, PUNCH, and PUNCH EJECT are combined with the control signals in an AND circuit to set the appropriate latch.

The READ CARD instruction signal is coupled to AND circuit 134 and along with the CTRL 3 and NOT PREV 1/O SW signals conditions AND 134. The Read Execute Latch is then set through OI 135 and inverter 136. The READ CARD instruction signal is also combined with the CTRL 11 signal, which is an interrupt control signal, in AI 137 and the output is coupled to latch reset AND circuit 138 along with latch connection 139 and the signal NOT MFCM STOP OR RES. The signal RD EX LT is coupled to AND circuit 140. When the other inputs comprising the PULSE C signal, NOT PCH EJ CY LT, and NOT FD CHCK signal are present, the output of the AND circuit is coupled through an OI circuit 141 and inverter 142 to set the Feed Cycle Latch. The output of the latch is coupled to two AND circuits 143, 144 and, when the FCB 1 to FCB 2 LT signal is present, one or the other of the AND circuits is conditioned depending on whether the PRI or the SEC signal is present. When the PRI signal is present, AND circuit 143 is conditioned to energize through driver 145 the Primary Read Insertion Roll Magnet 53 and when the SEC signal is present AND circuit 144 is conditioned to energize through driver 146 the Secondary Read Insertion Roll Magnet 54.

During a feed cycle the card coming from the read station is registered in the prepunch station when the Prepunch Registration Control Magnet is energized. Each of the prepunch registration control magnets is controlled by a latch. The Primary Prepunch Registration Control Magnet Latch is set by the presence of the PRI and FCB 3 signal to condition AND circuit 163. The output of the latch is coupled through driver 164 to actuate the magnet. The secondary prepunch registration latch is set by the signals SEC and FCB 3 which condition AND circuit 165. The output of the latch is coupled through driver 166 to energize the magnet. The punch push control magnets when energized during a punch push cycle cause the card in the prepunch station to be pushed into registration in the punch station. The punch push operation is controlled by the Punch Push Latch. The Punch Push Latch is set through AND circuit 167 by the presence of the signal CTRL 3, NOT PREV I/O SW, and PCH EX LT. The output of the latch is coupled to AND circuits 167, 168, 169, AND circuit 167 is conditioned by the additional signals MOT READY and NOT MECH CYC. The output of AND circuit 168 is coupled through driver 171 to energize the Punch Pusher Clutch Magnet. The Punch Push Control Primary Magnet is energized through AND circuit 169 by the foregoing three signals and the PRI signal, whereas the Punch Push Control Secondary Magnet is energized by the three signals and the SEC signal from the output of AND circuit 170.

The PUNCH CARD instruction signal is combined in AND circuit 147 with the signals CTRL 3 and NOT PREV I/O SW to set the Punch Execute Latch through OI 148 and inverter 149. The PCH EX LT signal is coupled to AND circuit 150 so that an output is present when the signals NOT PCH PUSH LT, PULSE C, READY and PCH DRIVE CBA is present. The punch drive CB A and B are alternately present so that when the PCH DRIVE CB A signal is present the Punch Drive A latch is set and the punch drive A magnet 151 is energized through driver 152. When the Punch Drive CB B signal is present the Punch Drive B latch is set and the punch drive B magnet 153 is energized through driver 154. The PUNCH EJECT CYCLE instruction signal is coupled to AND circuit 155 along with the CTRL 3 and NOT PREV I/O SW signals to set the Punch Eject Cycle Latch. The Punch Eject Cycle Latch signal is coupled to two AND circuits 156, 157 along with the signal FCB 1 to FCB 2 LT. The signals PR 1 and CD PRT EX LT are combined in AND circuit 158 and the output is coupled through OI 159 to the third input of AND 157. The output of AND circuit 157 is coupled through OI 160 and driver 161 to energize the Punch Eject Pressure Roll secondary magnet. The output of OI circuit 159 is coupled through an inverter 162 to AND circuit 156 so that the Punch Eject Pressure Roll Primary is energized. The Punch eject pressure rolls are also energized when the FD CYC LT signal is present with the NOT PCH EJ CYC LT signal and the FCB 1 to FCB 2 LT signal. The PRI or the SEC signal causes the corresponding Punch Eject Pressure Roll Magnet to be energized.

The signal from the instruction decoder which calls for a CARD PRINT operation is coupled to an AND circuit 171 along with the CTRL 7 signal and the NOT PREV I/O SW signal to set the Card Print Execute Latch. The output of the Card Print Execute Latch is coupled through AND circuit 172 in conjunction with the CLL 7 DK LT signal and the NOT MECH CYC signal to start a single shot multivibrator 173. One output of single shot 173 is coupled through OI circuit 174 to set the Print Allow Latch and the output of the Print Allow Latch is coupled through driver 175 to energize the Print Bail Magnet. Another output of single shot 173 is coupled to AND circuit 176 along with the PRT ALLOW signal, MOT READY signal, and the CD PRT CB 1 signal to set the Card Print Data Gate Latch. The CD PRT DAT GATE output is coupled to AND circuit 177 along with the CD PRT CB 2 signal to set the Print Pressure Roll Down Latch and the output before inverter 179 of this latch is coupled through driver 178 to de-energize the Print Pressure Roll Magnet to drop the pressure roll. The card is driven through the print station by an incremental drive mechanism 94 which may comprise a geneva mechanism, for example. When printing has been completed the print eject rolls are energized to move the card through stacker corner station inject feedroll 95 at high velocity to the cornering station. When the card covers sensing means 45, the presence of the STS REQ INLK signal, the NOT CLL 9 signal, and the PULSE C signal causes AND circuit 180 to be actuated to start a single shot multivibrator 181. The output of single shot 181 is coupled through driver 182 to actuate the corner kicker magnet. The corner kicker is an electromagnetically actuated device which pushes the card into the stacker feed rolls (not shown). The stacker feed rolls move the cards along a path adjacent to the stackers, and the movement of a card into a stacker is started by an electromagnetically actuated chute blade. The STACKER SELECT information is stored in an area of the storage device 46 in which data is stored designating the stacker into which a card is to be stacked and the feed in which the card originated. Suitable control means are provided to shift the position of this data in synchronism with the movement of the card through the machine. A STACKER SELECT instruction thus causes the stored data to read out from the storage location provided for the designated feed. This data is coupled to set latches STS 1, STS 2, STS 4 in the machine corresponding to the programmed stacker. The stackers are selected as shown below:

| STACKER POCKET | MAGNET SELECTED |
|---|---|
| 1 | NONE |
| 2 | 201 |
| 3 | 202 |
| 4 | 203 |
| 5 | 204 |

The signals from the stacker select latches are coupled through AND circuits 205–209 respectively to actuate the Stacker Select Magnets through the corresponding drivers.

Since a wide variety of card positions is possible in the machine, operator actuated indicators (not shown) which show the condition of the stacker select area of storage are available to show the position of cards within the machine. This feature is a valuable aid in reconstructing the position of the cards at the last completed processing step in the vent of a card jam.

While the invention has been particularly shown and described with reference to a preferred embodiment thereof, it will be understood by those skilled in the art that various changes in the form and details may be made therein without departing from the spirit and scope of the invention.

What is claimed is:

1. A record card processing machine comprising:
   a plurality of card feeding means and a plurality of processing stations arranged to form a first and a second separate card paths;
   a plurality of means selectively actuable at each of said processing stations for controlling said card feeding means in moving the cards through said processing stations;
   a plurality of card position sensing means;
   program means for providing a series of signals indicative of operations to be performed on said cards in said machine; and
   electronic control means operable under coincident control of said signals from said program means and said card position sensing means to generate signals to selectively actuate certain of said controlling means to move the record cards along the selected card path and to perform the operations specified by said program means on said record cards at the selected ones of said processing stations.

2. A record card processing machine comprising:
   a plurality of card feeding means and a plurality of processing stations arranged to form a first and a second separate card paths;
   a plurality of means for controlling said card feeding means in moving the cards through said processing stations;
   a plurality of card position sensing means including one sensing means mounted adjacent each of said processing stations;
   program means for providing a series of signals indicative of operations to be performed on said cards in said machine; and
   electronic control means operable under coincident control of said signals from said program means and said card position sensing means to generate signals to selectively actuate certain of said controlling means to move the record cards along the selected card path and to perform the operations specified by said program means on said record cards at the selected one of said selected processing stations.

3. A record card processing machine comprising:
a plurality of card feeding means and a plurality of processing stations arranged to form a first and a second separate card paths;
a plurality of means selectively actuable at each of said processing stations for controlling said card feeding means in moving the cards through said processing stations;
a plurality of card position sensing means including one sensing means mounted adjacent each of said processing stations;
program means for providing a series of signals indicative of operations to be performed on said cards in said machine; and
electronic control means operable under coincident control of said signals from said program means and said card position sensing means to generate signals to selectively actuate certain of said controlling means to move the record cards along the selected card path and to perform the operations specified by said program means on said record cards at the selected ones of said processing stations.

4. A record card processing machine comprising:
a plurality of card feeding means and a plurality of processing stations arranged to form a first and a second separate card paths;
a plurality of electromagnetic means selectively energizable at each processing station for controlling the card feeding means in moving the cards through said processing stations;
a plurality of card position sensing means;
program means for providing a series of signals indicative of operations to be performed on said cards in said machine; and
electronic control means operable under coincident control of signals from said program means and said card position sensing means to generate electric signals to selectively actuate certain of said electromagnetic means to move the records along the selected card path to perform the indicated record card operations.

5. A record card processing machine comprising:
a plurality of card feeding means and a plurality of processing stations arranged to form a first and a second separate card paths;
a plurality of electromagnetic means selectively energizable at each processing station for controlling the card feeding means in moving the cards through said processing stations;
a plurality of card position sensing means including one sensing means mounted adjacent each of said processing stations;
program means for providing a series of signals indicative of operations to be performed on said cards in said machine; and
electronic control means operable under coincident control of signals from said program means and said card position sensing means to generate electric signals to selectively actuate certain of said electromagnetic means to move the record cards along the selected card path to perform the indicated record card operations.

6. A record card processing machine comprising:
a plurality of card feeding means and a plurality of processing stations arranged to form a first and a second card path;
a plurality of electromagnetic means selectively energizable at each processing station for controlling the card feeding means in moving the cards through said processing stations;
a plurality of card position sensing means including one sensing means mounted adjacent to each of said processing stations;
means for generating electrical signals synchronized with the mechanical cycle of the machine; and
control means comprising a program decoding means and control circuit means;
said control circuit means being operable under coincident control of said program decoding means, said card position sensing means and said synchronization signal generating means to generate electric signals to selectively actuate certain of said electromagnetic means to move the record cards along the card path through certain processing stations to perform the programmed record card function.

7. A record card processing machine comprising:
a plurality of card feeding means and a plurality of processing stations arranged to form first and second card paths;
a plurality of electromagnetic means for controlling the card feeding means in moving the cards through said processing stations;
a plurality of card position sensing means;
means for generating electrical signals synchronized with the mechanical cycle of the machine;
program means for providing a series of signals indicative of operations to be performed on said cards; and
electronic control means operable under coincident control of signals from said program means, said card position sensing means and said synchronization signal generating means to generate electric signals to selectively actuate certain of said electromagnetic means to move the record cards along the card path to perform the indicated record card operations at the selected ones of said processing stations.

8. A record card processing machine comprising:
a plurality of card feeding means and a plurality of processing stations arranged to form a first and a second card paths;
said card feeding means comprising first constantly running feedroll means and second and third card feeding means selectively actuable to cooperate with said first feedroll means for feeding record cards along said card paths;
an electromagnetically controlled clutching means for actuating said second feeding means for operation under control of a cyclic mechanical device;
a plurality of electromagnetic means for controlling said third card feeding means in moving the cards through said processing stations;
a plurality of card position sensing means;
program means for providing a series of signals indicative of operations to be performed on said cards in said machine; and
electronic control means operable under coincident control of said program means and said card position sensing means to generate electric signals to selectively actuate said electromagnetic control means to move the record cards along the card path to perform the indicated record card operations at the selected ones of said processing stations.

9. A record card processing machine comprising:
a plurality of card feeding means and a plurality of processing stations arranged to form a first and a second separate card paths and a common card path; each of said card paths comprising a plurality of processing stations;
a plurality of electromagnetic means selectively energizable at each processing station for controlling the card feeding means in moving the cards through said processing stations;
a plurality of card position sensing means including one sensing means mounted adjacent each of said processing stations;

program means for providing a series of signals indicative of operations to be performed on said cards; and electronic control means operable under coincident control of said signals from said program means and said card position sensing means to generate electric signals to selectively actuate certain of said electromagnetic means to move the record cards along the selected card path and to perform the indicated record card operations specified by said program means on said record cards over the ones of the selected card paths.

10. A record card processing machine comprising:

a plurality of card feeding means and a plurality of processing stations comprising a separate processing station in each of a first and a second separate card path feeding into a common record card sensing station, a second separate processing station in each of said card paths, and a common record card marking station;

a plurality of electromagnetic means selectively energizable at each processing station for controlling the card feeding means in moving the cards through said processing stations;

a plurality of card position sensing means mounted adjacent each of said processing stations;

program means for providing a series of signals indicative of operations to be performed on said cards; and electronic control means operable under coincident control of said signals from said program means and said card position sensing means to generate electric signals to selectively actuate certain of said electromagnetic means to move the record cards along the selected card path and to perform the indicated record card operations specified by said program means on said record cards over the ones of the selected card paths.

References Cited

UNITED STATES PATENTS

| | | | |
|---|---|---|---|
| 3,116,922 | 1/1964 | Coanet | 271—9 XR |
| 2,602,544 | 7/1952 | Phelps et al. | 235—61.7 XR |
| 2,603,416 | 7/1952 | Bryce et al. | 235—61.7 |
| 2,990,957 | 7/1961 | Sarley et al. | 235—61.7 XR |
| 3,070,204 | 12/1962 | Bradshaw | 101—2 |

THOMAS A. ROBINSON, Primary Examiner

U.S. Cl. X.R.

234—15; 271—9